Aug. 4, 1942.  H. A. DAVIS  2,292,105
FLUID PRESSURE BRAKE EQUIPMENT
Filed Jan. 6, 1942
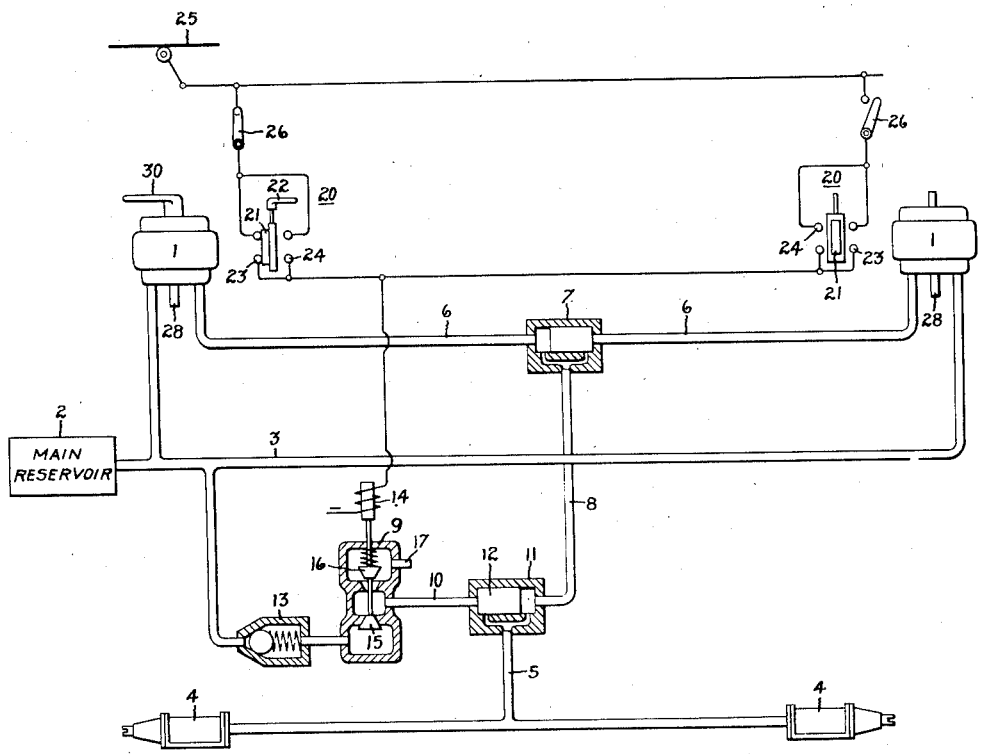
Inventor:
Horace A. Davis,
by Harry E. Dunham
His Attorney.

Patented Aug. 4, 1942

2,292,105

UNITED STATES PATENT OFFICE 2,292,105

FLUID PRESSURE BRAKE EQUIPMENT

Horace A. Davis, Greenwich, Conn., assignor to General Electric Company, a corporation of New York Application January 6, 1942, Serial No. 425,737

6 Claims. (Cl. 303—13)

My invention relates to fluid pressure brake equipment and more particularly to such equipments for use on double-end electrically propelled vehicles.

When a fluid pressure brake equipment is used on a double-end vehicle, it is essential that the braking apparatus be so designed that the brakes are always applied when the operator goes from one operating end to the other. Such an arrangement is necessary in order to prevent any possibility of the vehicle moving while it is not under the control of the operator.

One object of my invention is to provide an improved arrangement of apparatus for insuring that the fluid pressure brakes of a double-end vehicle are applied while the operator is changing ends.

My invention will be better understood from the following description when taken in connection with the accompanying drawing, the single figure of which diagrammatically illustrates a double-end fluid pressure brake equipment embodying my invention, and its scope will be pointed out in the appended claims.

In order to simplify the disclosure, I have embodied my invention in the accompanying drawing in a well-known type of double-end straight air brake equipment comprising a brake valve 1 at each end of the vehicle, a main reservoir 2, a main reservoir pipe 3 connecting the main reservoir 2 to each of the brake valves 1, a plurality of brake cylinders 4 connected to a brake cylinder pipe 5, a straight air pipe 6 connected to each brake valve 1, and a double check valve device 7 in the straight air pipe 6 for controlling communication through the straight air pipe 6 from the brake valve 1 at either end of the vehicle to a pipe 8 through which fluid is arranged to be supplied to the brake cylinder pipe 5.

In addition to the above-mentioned apparatus of a straight air brake equipment, I provide, in accordance with my invention, a magnet valve 9 of the well-known "off" type, which controls communication between the main reservoir pipe 3 and a pipe 10 connected to one side of a double check valve device 11, the other side of which is connected to the pipe 8. The valve 12 in the double check valve device 11 controls communication from the pipes 8 and 10 to the brake cylinder pipe 5. Preferably a loaded check valve 13 of any suitable type, examples of which are well-known in the art, is interposed between the main reservoir pipe 3 and the pipe 10 so as to reduce the pressure of the fluid supplied to the double check valve device 11 through the pipe 10 when the magnet valve 9 is deenergized.

The magnet valve 9 comprises a magnet 14 which, when energized, closes a valve 15 to shut off communication between the main reservoir pipe 3 and the pipe 10 and opens a valve 16 to establish communication between the pipe 10 and an exhaust pipe 17. The energization of the magnet 14 is controlled by the position of the reversers 20, one of which is provided at each end of the vehicle to control the connections between the motor controller located at that end and the driving motors of the vehicle so that the motors can be controlled at either end to effect movement of the vehicle in either a forward or a backward direction. Such reversers are well known in the art and usually have three positions, namely, a forward position in which the electric motors are operative to move the vehicle in a forward direction, a reverse position in which the electric motors are operative to move the vehicle in a backward direction, and a neutral position in which the electric motors cannot be controlled and which is the only position in which the operating handle of the reverser can be removed. Since the construction of such reversers is well known in the art, and the details thereof constitute no part of my present invention, I have merely represented each reverser 20 as comprising a movable contact 21, which is adapted to be operated by a removable handle 22 so that it bridges the contacts 23 when the reverser is in its forward position and bridges the contacts 24 when the reverser is in its reverse position and so that the contact 21 is not in engagement with either the contacts 23 or the contacts 24 when the reverser is in its neutral position. The magnet 14 is preferably supplied with current from the power supply circuit 25 for the vehicle through a power switch 26, one of which is located at each end of the vehicle.

The operation of the arrangement shown in the drawing is as follows: It will first be assumed that the vehicle is being operated from the left-hand end thereof so that the power switch 26 at that end is closed, and the reverser 20 at that end is in its forward position so that the contacts 23 thereof are bridged by the contact 21 to complete an energizing circuit for the magnet 14 of the magnet valve 9 to close the valve 15 and thereby cut off the communication between the main reservoir pipe 3 and the pipe 10. Since the valve 16 of the magnet valve 9 is also open, communication is established between the pipe 10 and the exhaust pipe 17. At the non-operating end of the vehicle, the power switch 26 is open, and the reverser 20 is in its neutral position. While the vehicle is being propelled by the electric motors, the brake valves 1 at both ends are in their release positions so that the corresponding ends of the straight air pipe 6 are connected to atmosphere through the associated exhaust pipes 28.

When the operator desires to apply the brakes, he moves the brake valve 1 at the operating end to a brake application position, in which position, communication is shut off between the corresponding end of the straight air pipe 6 and the exhaust pipe 28, and communication is established between the main reservoir pipe 3 and the operating end of the straight air pipe 6. The admission of fluid pressure to the operating end of the straight air pipe 6 operates the double check valve 7 so as to establish communication between the operating end of the straight air pipe 6 and the pipe 8 and to cut off communication between the nonoperating end of the straight air pipe 6 and the pipe 8. The increase in fluid pressure in the pipe 8, in turn, operates the double check valve 12 so as to establish communication between the pipe 8 and the brake cylinder pipe 5 and to cut off communication between the pipe 10 and the brake cylinder pipe 5. Therefore, when the brake valve 1 at the operating end is moved to a brake application position, fluid pressure is supplied from the main reservoir pipe 3 to the brake cylinders 4 to effect an application of the fluid-operated brakes.

When it is desired to release the brakes, the operator moves the brake valve handle at the operating end to its release position, in which position communication is established between the straight air pipe 6 and the exhaust pipe 28 to allow the fluid pressure in the brake cylinders 4 to be exhausted to atmosphere.

In changing ends, the operator first brings the vehicle to a stop by moving the brake valve 1 at the operating end to a brake application position so as to effect a brake application in the manner above described. The operator then opens the power switch 26 at the operating end and also moves the reverser 20 at the operating end to its neutral position so that the handle thereof can be removed. In this manner, the magnet 14 is deenergized so that the valve 16 is closed to shut off communication from the pipe 10 and the exhaust pipe 17 and the valve 15 is opened to establish communication between the main reservoir pipe 3 and the pipe 10 through the check valve 13. Fluid pressure is thereby supplied to the lefthand side of the double check valve 12. The operator then moves the brake valve 1 at the operating end to its release position, in which position the operating handle 30 thereof can be removed. By moving the brake valve 1 at the operating end to its release position, the operating end of the straight air pipe 6 is connected to the exhaust pipe 28 so that the fluid pressure in the pipes 6 and 8 is vented to atmosphere. As soon as the pressure in the pipe 8 decreases below the pressure which is now being supplied to pipe 10 through the magnet valve 9, the double check valve 12 moves to the right so that communication is established between the brake cylinder pipe 5 and the pipe 10, to maintain the brakes applied and communication is cut off between the brake cylinder pipe 5 and the pipe 8.

The operator then removes the brake valve handle 30 and the reverse handle 22 and carries them to the end of the vehicle and respectively attaches them to the brake valve 1 and the reverser 20 at that end. He then moves the reverser at that end to its forward position so that the contacts 23 thereof are bridged by contact 21, and then moves the brake valve 1 to a brake application position so that fluid pressure is supplied from the main reservoir pipe 3 to the pipe 8 through the straight air pipe 6 at the new operating end and the double check valve 7, which is now moved to its left-hand position so as to establish communication between the operating end of the straight air pipe 6 and the pipe 8. The operator next closes the power switch 26 at the operating end so that the circuit of the magnet 14 of the magnet valve 9 is completed to effect the opening of the valve 16 and the closing of the valve 15. The opening of the valve 16 establishes communication between the pipe 10 and the exhaust pipe 17 so that the fluid pressure in the pipe 10 is vented to atmosphere. As soon as the pressure in the pipe 10 decreases below the pressure in the pipe 8, the double check valve 12 moves to the left so that communication is established between the pipe 8 and brake cylinder pipe 5 and is cut off from the brake cylinder pipe 5 and pipe 10. The brakes may then be released in the usual manner by moving the brake valve 1 at the operating end to its release position.

It will be obvious to those skilled in the art that my improved arrangement of apparatus is of particular utility when used in connection with the well known PCC type of control in which there is an interlocking arrangement between the reversers and the dead man's control, not shown, whereby the dead man's feature is nullified when either the reverser is in its neutral position or an application of the brakes has been effected.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States is:

1. In a double end brake equipment for an electrically propelled vehicle, a reverser at each end having an operating position and a neutral position, a straight air pipe, a brake cylinder, an air reservoir, a brake valve at each end for establishing communication between said straight air pipe and said reservoir and between said straight air pipe and atmosphere, a control pipe, a magnet valve for establishing communication between said reservoir and said control pipe when the magnet of said valve is energized and for establishing communication between said control pipe and atmosphere when said magnet is deenergized; means dependent upon one of said reversers being in its operating position for completing an energizing circuit for said magnet, and valve means operative in response to the relative pressures in said straight air and control pipes for establishing communication between said brake cylinder and whichever of said pipes contains the greater pressure.

2. In a double end brake equipment for an electrically propelled vehicle, a reverser at each end having an operating position and a neutral position, a straight air pipe, a brake cylinder, an air reservoir, a brake valve at each end for establishing communication between said straight air pipe and said reservoir and between said straight air pipe and atmosphere, a control pipe, a magnet valve for establishing communication between said reservoir and said control pipe when the magnet of said valve is energized and for establishing communication between said control pipe and atmosphere when said magnet is deenergized, means dependent upon one of said reversers being in its operating position for completing an energizing circuit for said magnet, and a double check valve interposed between said pipes for controlling communication between said brake cylinder and said pipes.

3. In a double end brake equipment for an electrically propelled vehicle, a reverser at each end having an operating position and a neutral position, a straight air pipe, a brake cylinder, an air reservoir, a brake valve at each end for establishing communication between said straight air pipe and said reservoir and between said straight air pipe and atmosphere, a control pipe, a one way check valve, a magnet valve for establishing communication from said reservoir to said control pipe through said check valve when the magnet of said valve is energized and for establishing communication between said control pipe and atmosphere when said magnet is deenergized; means dependent upon one of said reversers being in its operating position for completing an energizing circuit for said magnet, and valve means operative in response to the relative pressures in said straight air and control pipes for establishing communication between said brake cylinder and whichever of said pipes contains the greater pressure.

4. In a double end brake equipment for an electrically propelled vehicle, a reverser at each end having an operating position and a neutral position, a straight air pipe, a brake cylinder, an air reservoir, a brake valve at each end for establishing communication between said straight air pipe and said reservoir and between said straight air pipe and atmosphere, a control pipe, a one way check valve, a magnet valve for establishing communication from said reservoir to said control pipe through said check valve when the magnet of said valve is energized and for establishing communication between said control pipe and atmosphere when said magnet is deenergized; means dependent upon one of said reversers being in its operating position for completing an energizing circuit for said magnet, and a double check valve interposed between said pipes for controlling communication between said brake cylinder and said pipes.

5. In a double end brake equipment for an electrically propelled vehicle, a reverser at each end having an operating position and a neutral position, a straight air pipe, a brake cylinder, an air reservoir, a brake valve at each end for establishing communication between said straight air pipe and said reservoir and between said straight air pipe and atmosphere, a control pipe, a magnet valve for establishing communication between said reservoir and said control pipe when the magnet of said valve is energized and for establishing communication between said control pipe and atmosphere when said magnet is deenergized; a power switch for said vehicle at each end thereof, means dependent upon one of said reversers being in its operating position at the same time the power switch at the same end of the vehicle is closed for completing an energizing circuit for said magnet, and valve means operative in response to the relative pressures in said straight air and control pipes for establishing communication between said brake cylinder and whichever of said pipes contains the greater pressure.

6. In a double end brake equipment for an electrically propelled vehicle, a reverser at each end having an operating position and a neutral position, a straight air pipe, a brake cylinder, an air reservoir, a brake valve at each end for establishing communication between said straight air pipe and said reservoir and between said straight air pipe and atmosphere, a control pipe, a magnet valve for establishing communication between said reservoir and said control pipe when the magnet of said valve is energized and for establishing communication between said control pipe and atmosphere when said magnet is deenergized; a power switch for said vehicle at each end thereof, means dependent upon one of said reversers being in its operating position at the same time the power switch at the same end of the vehicle is closed for completing an energizing circuit for said magnet, and a double check valve interposed between said pipes for controlling communication between said brake cylinder and said pipes.

HORACE A. DAVIS.